(12) United States Patent
Yoshida et al.

(10) Patent No.: US 7,765,045 B2
(45) Date of Patent: Jul. 27, 2010

(54) MANUAL OPERATION SYSTEM

(75) Inventors: Ichiro Yoshida, Takahama (JP);
Hiroshige Asada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 955 days.

(21) Appl. No.: 11/505,385

(22) Filed: Aug. 17, 2006

(65) Prior Publication Data
US 2007/0055423 A1 Mar. 8, 2007

(30) Foreign Application Priority Data
Sep. 2, 2005 (JP) ............................. 2005-254964
Jul. 21, 2006 (JP) ............................. 2006-199455

(51) Int. Cl.
*G06F 7/00* (2006.01)
(52) U.S. Cl. ..................... 701/36; 345/167; 345/184; 307/9.1; 463/37; 704/275
(58) Field of Classification Search ................. 701/36, 701/49, 53, 200, 207, 208; 704/275; 463/37; 307/9.1; 345/167, 184
See application file for complete search history.

(56) References Cited

U.S. PATENT DOCUMENTS

| | | | | |
|---|---|---|---|---|
| 5,159,687 A | * | 10/1992 | Richburg | .................... 717/106 |
| 5,515,345 A | * | 5/1996 | Barreira et al. | .................. 369/6 |
| 5,734,373 A | * | 3/1998 | Rosenberg et al. | ........... 345/161 |
| 6,131,060 A | * | 10/2000 | Obradovich et al. | ........... 701/49 |
| 6,154,201 A | * | 11/2000 | Levin et al. | .................. 345/184 |
| 6,184,868 B1 | * | 2/2001 | Shahoian et al. | ............. 345/161 |
| 6,348,772 B1 | * | 2/2002 | May | ........................... 318/430 |
| 6,593,667 B1 | | 7/2003 | Onodera et al. | |
| 6,636,197 B1 | * | 10/2003 | Goldenberg et al. | ........ 345/156 |
| 6,859,198 B2 | * | 2/2005 | Onodera et al. | ............. 345/161 |
| 6,885,925 B2 | | 4/2005 | Sanpei et al. | |
| 7,062,365 B1 | * | 6/2006 | Fei | .............................. 701/36 |
| 2002/0151295 A1 | * | 10/2002 | Boss et al. | ................... 455/412 |
| 2002/0169776 A1 | * | 11/2002 | Tuunanen et al. | .............. 707/9 |
| 2004/0027352 A1 | * | 2/2004 | Minakuchi | .................... 345/473 |
| 2004/0117084 A1 | * | 6/2004 | Mercier et al. | ................. 701/36 |
| 2004/0122562 A1 | * | 6/2004 | Geisler et al. | .................. 701/1 |
| 2004/0122564 A1 | * | 6/2004 | Ogasawara | ..................... 701/1 |
| 2006/0047386 A1 | * | 3/2006 | Kanevsky et al. | ............. 701/36 |
| 2007/0005206 A1 | * | 1/2007 | Zhang et al. | ................... 701/36 |

FOREIGN PATENT DOCUMENTS

JP        A-2003-153354        5/2003

* cited by examiner

*Primary Examiner*—Khoi Tran
*Assistant Examiner*—Jaime Figueroa
(74) *Attorney, Agent, or Firm*—Posz Law Group, PLC

(57) ABSTRACT

A manual operation system for use in a vehicle under control of a user includes an operation unit, an actuator, a detector, a memory unit, a first control unit an interaction unit, and a second control unit. The second control unit of the manual operation system changes force data and control data used by the first control unit for controlling the actuator that actuates the operation unit based on at least one of a content of an interaction provided by the interaction unit and an operation position of the operation unit detected by the detector.

11 Claims, 12 Drawing Sheets

FIG. 9

EXAMPLE 1-1

| STEP | USER'S VOICE/OPERATION | INTERACTION UNIT'S ACTION |
|---|---|---|
| S501 | "AGENT CALL" | |
| S503 | | START AGENT CALL PROCESS |
| S505 | | AGENT RESPONSE "AGENT, WAITING." |
| S507 | | RECEIVE USER'S REQUEST "MAY I HELP YOU?" |
| S509 | "VOLUME CONTROL" | |
| S511 | | TEXT CONVERSION |
| S513 | | AGENT RESPONSE "VOLUME CONTROL?" |
| S515 | "YES" | |
| S517 | | RESPONSE DETERMINATION |
| S519 | | DETERMINE USE OF MANUAL CTRL. DEVICE 11 →REQUIRED |
| S521 | | RECEIVE USER'S REQUEST "WOULD YOU USE MANUAL CTRL. DEVICE 11?" |
| S523 | "YES" | |
| S525 | | RESPONSE DETERMINATION |
| S527 | | SCRIPT GENERATION PROCESS |
| S529 | | EXECUTE SCRIPT, SEND SIGNAL TO MANUAL CTRL. DEVICE 11 |
| S531 | | RECEIVE SETTING COMPLETE NOTICE |
| S533 | | ANNOUNCE NOTICE "MANUAL CTRL. DEVICE 11 READY." |
| S535 | OPERATE MANUAL CTRL. DEVICE 11 | |
| S537 | "OK" | |
| S539 | | RESULT NOTIFICATION "VOLUME SET TO 5." |

FIG. 10

EXAMPLE 1-2

| STEP | USER'S VOICE/OPERATION | INTERACTION UNIT'S ACTION |
|---|---|---|
| S541 | "CHANGE FORCE DATA" | |
| S543 | | "CHANGES FORCE DATA. INPUT CHANGE POINT." |
| S545 | "AROUND HERE" | |
| S547 | | DETECT CHANGE PT. AND VISUALIZE FORCE DATA |
| S549 | | "CHANGE PT. DETECTED. INPUT HOW." |
| S551 | "PEAK DOWN" | |
| S553 | | DECREASE REACTION FORCE BY 10% "REACTION FORCE DECREASED BY 10%. HOW DO YOU LIKE IT?" |
| S555 | "PEAK DOWN" | |
| S557 | | DECREASE REACTION FORCE BY 10% "REACTION FORCE DECREASED BY 10%. HOW DO YOU LIKE IT?" |
| S559 | "PEAK UP A LITTLE" | |
| S561 | | INCREASE REACTION FORCE BY 5% "REACTION FORCE INCREASED BY 5%. HOW DO YOU LIKE IT?" |
| S563 | "OK" | |
| S565 | | "FORCE DATA FIXED AS IT IS." |
| S567 | | STORE FORCE DATA |

FIG. 11

EXAMPLE 2

| STEP | USER'S VOICE/OPERATION | INTERACTION UNIT'S ACTION |
|---|---|---|
| S601 | "AGENT CALL" | |
| S603 | | START AGENT CALL PROCESS |
| S605 | | AGENT RESPONSE "AGENT, WAITING." |
| S607 | | RECEIVE USER'S REQUEST "MAY I HELP YOU?" |
| S609 | "CHANGE VOLUME TO 5" | |
| S611 | | TEXT CONVERSION |
| S613 | | AGENT RESPONSE "WOULD YOU CHANGE VOLUME TO 5?" |
| S615 | "YES" | |
| S617 | | RESPONSE DETERMINATION |
| S619 | | DETERMINE USE OF MANUAL CTRL. DEVICE 11 →NOT REQUIRED |
| S621 | | SCRIPT GENERATION PROCESS |
| S623 | | EXECUTE SCRIPT, SEND SIGNAL TO AUDIO |
| S625 | | RECEIVE SETTING COMPLETE NOTICE |
| S627 | | RESULT NOTIFICATION "VOLUME SET TO 5." |

FIG. 12

EXAMPLE 3

| STEP | USER'S VOICE/OPERATION | INTERACTION UNIT'S ACTION |
|---|---|---|
| S701 | "AGENT CALL" | |
| S703 | | START AGENT CALL PROCESS |
| S705 | | AGENT RESPONSE "AGENT, WAITING." |
| S707 | | RECEIVE USER'S REQUEST "MAY I HELP YOU?" |
| S709 | "CHANGE FORCE DATA" | |
| S711 | | TEXT CONVERSION |
| S713 | | AGENT RESPONSE "WOULD YOU CHANGE FORCE DATA?" |
| S715 | "YES" | |
| S717 | | RESPONSE DETERMINATION |
| S719 | | "CHANGES FORCE DATA. WHAT FUNCTION WOULD YOU CHANGE?" |
| S721 | "POWER OF AIR-CONDITIONER" | |
| S723 | | "INPUT CHANGE POINT." |
| S725 | "AROUND HERE" | |
| S727 | | DETECT CHANGE PT. AND VISUALIZE FORCE DATA |
| S729 | | "CHANGE PT. DETECTED. INPUT HOW." |
| S731 | "ROUND OFF" | |
| S733 | | REACTION FORCE ROUND OFF "CHANGE PT. ROUNDED OFF. HOW DO YOU LIKE IT?" |
| S735 | "OK" | |
| S737 | | "FORCE DATA FIXED AS IT IS." |
| S739 | | STORE FORCE DATA |

MANUAL OPERATION SYSTEM

CROSS REFERENCE TO RELATED APPLICATION

This application is based on and claims the benefit of priority of Japanese Patent Application No. 2005-254964 filed on Sep. 2, 2005, and No. 2006-199455 filed on Jul. 21, 2006, the disclosure of which is incorporated herein by reference.

FIELD OF THE INVENTION

The present invention generally relates to a manual operation system in a vehicle.

BACKGROUND OF THE INVENTION

In recent years, various vehicular systems and devices such as an air-conditioner, a radio/CD/DVD player, a navigation system and the like are controlled by using a manually operated control device. More practically, control information for setting temperature, for a selection of radio stations, or for organizing a navigation route or the like is displayed on a display unit, and a user, i.e., an occupant or a driver of the vehicle, is encouraged to control operation conditions of those systems and devices through, for example, a button in a touch panel on the display unit or the like.

However, the occupant of the vehicle is required to watch the operation conditions represented on the display unit very carefully in order to see the result of his/her control while being involved in, for example, a driving operation of the vehicle. In other words, an arbitrary arrangement of the buttons and/or indicators on the display unit may not be very easy to read in terms of readiness for control result recognition unless the occupant are familiar with the arrangement of the buttons and/or representation of the control result.

In view of the above-described problems, disclosure in US Patent Document U.S. Pat. No. 6,593,667 describes a technique of "Haptics," or a reaction force control technique in response to an operation position of the control device and/or a situation of a control operation. This technique controls a manual operation of a control interface of various devices by providing a reaction force to the interface according to an operation position, an operation condition or the like. The disclosure of the above document also describes an application of a thrusting force in addition to the reaction force.

More practically, the application of the reaction force works in the following manner. That is, Haptics technique provides resistance to restrict a volume-up control operation of, for example, a radio/CD player by applying a reaction force when the user operates a manual operation volume control switch on the CD player, and provides assistance to facilitate a volume-down control operation of the manual operation volume control switch by applying a thrusting force to facilitate the volume-down control. In this manner, a sudden burst of a large sound by mistake is prevented when the occupant controls the volume switch toward a greater sound volume, or a sharp decrease of large sound is achieved for providing a conversational environment in the vehicle based on the thrusting force for the volume down control. The control operations such as the volume-up/down control or the like assisted by the Haptics technique are implemented differently depending on the object device (e.g., the air-conditioner, a navigation system, an audio player etc.). The object device itself of the control operation is changed by operating the control device.

The manually operated control device may be intuitively and/or easily operated when the user remembers respective positions of assigned functions. However, the operation may not be very easily when the user is not familiar with the device or when the user has never operated a similar device. That is, the user may have a hard time for finding an appropriate operation position for executing the respective functions in trials and errors.

Further, the control device may be vocally controlled based on recognition of user's voice in an interactive dialogue with the control device. However, the user can not expect a quick response from the vocal control, thereby suffering from discrepancy between an intended level of control for, for example, a sound volume based on the sound volume actually sensed by the user and a result of the vocal control. That is, the user may feel discomfort due to the discrepancy caused by a delay of the vocal control for the sound volume.

SUMMARY OF THE INVENTION

In view of the above-described and other problems, the present disclosure provides a manual operation system having usability that is usually acquired by practice and/or experience.

The manual operation system for use in a vehicle under control of a user includes an operation unit, an actuator, a detector, a memory unit, a first control unit an interaction unit, and a second control unit.

The operation unit is a unit that is operated by the user. The actuator is a power source that actuates the operation unit. The detector is a unit for detecting an operation position of the operation unit. The memory unit is a unit for storing a combination of force data and control data. The force data defines a relationship between a detection result of the detector and a control value of the actuator, and the control data defines a relationship between the detection result of the detector and a control signal for controlling an object device. The first control unit is a unit for outputting the control value to the actuator and outputting the control signal to the object device based on the force data, the control data and the detection result of the detector. The interaction unit is a unit for vocally providing an interaction with the user. The second control unit is a unit for changing force data and control data used by the first control unit for controlling the actuator based on a content of the interaction provided by the interaction unit.

The manual operation system having above-described components can provide specific force data and specific control data for controlling a specific function based on the interaction with the user. More practically, control data for controlling the sound volume of an audio system is used in the manual operation system based on the interaction with the user. For example, the control data controls the operation of the operation unit only in a front-back direction for increasing and decreasing the sound volume by using the force data associated therewith. In this manner, the user of the manual operation system does not suffer from operation errors even when he/she is not an experienced operator.

The force data and the control data used by the first control unit is provided or switched based on various criteria. For example, a device ID, a user ID, a vehicle condition or the like is acquired and used as provision criteria. However, provision determination process is complicated in some cases depending on a situation. Therefore, the process is recorded and stored as a script for reuse. That is, the second control unit generates and stores a script based on the interaction with the user, and executes the stored script for specifically providing the force data and the control data for a specific function. In this manner, the provision of the force data and the control data is facilitated by retrieving and executing the stored script.

The force data and the control data used by the manual operation system are switched for suitably changing a reaction force of the manual operation system. In this manner, the operability of the operation unit is suitably adjusted to a driving situation. That is, the use in a running vehicle is only allowed to operate the operation unit in a simple manner, while the user in a stopping vehicle is allowed to operate the operation unit in a more complicated manner, based on the adjustment of the reaction force. In this manner, the manual operation system provides for the user an improved operability by reducing chance of the operation error with an adjustment of the data.

The adjustment of the data may be provided directly by the interaction itself instead of the operation of the operation unit. In this manner, the user has an option of controlling the force data and the control data directly by the interaction with the system for an improved usability.

Further, operation result is vocally provided for the user, thereby improving the convenience of the user in terms of having a confirmation of the operation.

Furthermore, the user can control modification of the force data by controlling the manual operation system with a vocal command. In this case, the force data is modified instead of switched. In this manner, the reaction force of the operation unit is modified for the user's comfort, or for the ease of operation.

Furthermore, the user can control modification of the force data with the interaction instead of the vocal command. In this case, the modification is facilitated by the interactive conversation initiated by the manual operation system.

Furthermore, the modification takes account of the information from the detector. That is, the operation position of the operation unit is specified by the operation unit itself. In this manner, the modification of the force data by the user is facilitated. In addition, the modification of the force data may be allowed for the user only in a stopping vehicle, thereby serving the user an improved safety in driving.

BRIEF DESCRIPTION OF THE DRAWINGS

Other objects, features and advantages of the present invention will become more apparent from the following detailed description made with reference to the accompanying drawings, in which:

FIG. 9 shows a first half of a first example of an interaction between the user and the interaction unit illustrated in a table form;

FIG. 10 shows a second half of the first example of the interaction between the user and the system illustrated in a table form;

FIG. 11 shows a second example of the interaction between the user and the system illustrated in a table form;

FIG. 12 shows a third example of the interaction between the user and the system illustrated in a table form.

DETAILED DESCRIPTION OF THE PREFERRED EMBODIMENTS

Embodiments of the present disclosure are described with reference to the drawings. The embodiments of the present disclosure are not necessarily limited to the types/forms in the present embodiment, but may take any form of the art or technique that is regarded within the scope of the present disclosure by artisans who have ordinary skills in the art.

Figure 1:
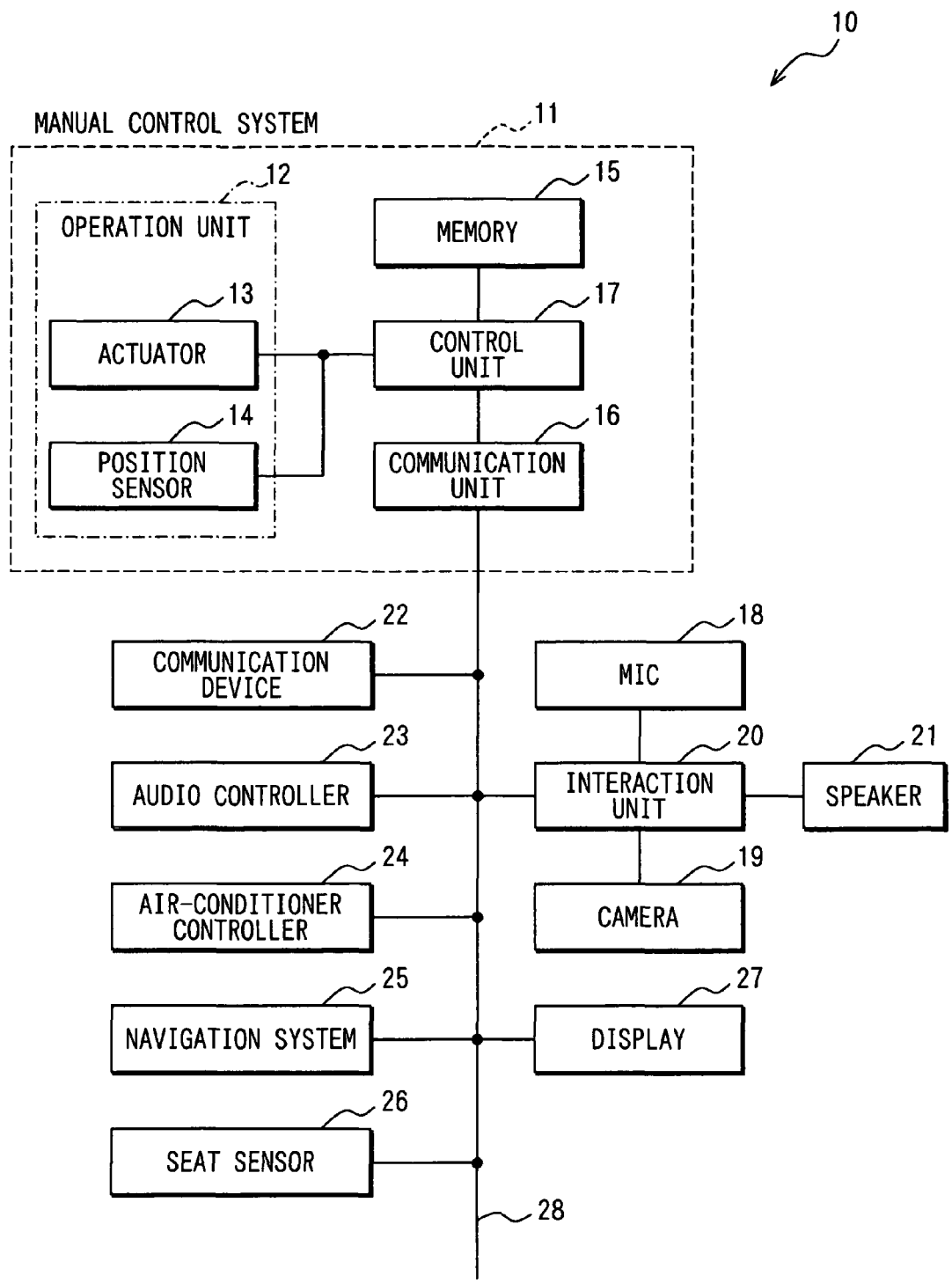
FIG. 1 shows a block diagram of a manual operation system in an embodiment of the present disclosure.

FIG. 1 shows a block diagram of a manual control device 11 and relevant devices coupled therewith. The manual control device and the relevant devices make a manual control system 10 of the present disclosure. The manual control device 11 includes an operation unit 12, an actuator 13, a position sensor 14, a memory 15, a communication unit 16, and a control unit 17. The communication unit 16 is coupled with an interaction unit 20, a communication device 22, an audio controller 23, an air-conditioner controller 24, a navigation system 25, a seat sensor 26, and a display unit 27 through a vehicle LAN 28. The interaction unit 20 is coupled with a microphone 18, a camera 19 and a speaker 21.

The operation unit 21 is a unit that is operated by the driver of the vehicle, or a user of the manual control device 11. Details of the operation unit 21 are described later.

The actuator 13 actuates, or provides a force to the operation unit 12 based on a control value inputted from the control unit 17.

The position sensor 14 is a sensor that detects an operation condition and/or an operation position of the operation unit 12, and outputs a detection result to the control unit 17.

The memory 15 is a storage that stores data such as force data, control data, image recognition data (for identifying the driver based on an image recognition) or the like. The force data is a relationship between the operation condition of the operation unit 12 and the control value for operating the actuator 13. The control data is a collective set of values that represents a relationship between the operation position of the operation unit 12 and a control signal to be outputted for controlling vehicular devices such as an audio system, an air-conditioner, a navigation system or the like. The force data and the control data are associated with an ID for identifying the driver of the vehicle for serving individual drivers.

The communication unit 16 exchanges information with various devices in the vehicle through the vehicle LAN 28.

The control unit 17 includes a CPU, a ROM, a RAM and the like for sending control values to the actuator 13, the communication unit 16 or the like based on the force data and the control data retrieved in the RAM.

The vehicle LAN 28 is a local area network extended in the vehicle, and is used for information exchange between the vehicular devices such as the communication device 22, the audio controller 23, the air-conditioner controller 24, the navigation system 25, the seat sensor 26 and the like.

The microphone 18 outputs a voice signal to the interaction unit 20 based on a user's voice when the user's voice is inputted thereto.

The camera 19 is a camera disposed in a room mirror for mainly capturing a face of the user, i.e., the driver of the vehicle. An image captured by the camera 19 is outputted to the interaction unit 20.

The speaker 21 is coupled with the interaction unit 20, and outputs a voice based on the voice signal from the interaction unit 20.

The interaction unit 20 includes a microcomputer of well known type having a CPU, a ROM, a RAM, a SRAM, an I/O and a bus line for connecting these components. The interaction unit 20 serves as an agent that controls interaction or a dialog with the user by executing programs stored in the ROM and the RAM.

The communication device 22 is a device that communicates with a cellular phone, a PDA, or the like. The communication device 22 in the present embodiment communicates with a device based on a Bluetooth (Registered Trademark) communication standard.

The audio controller 23 controls an audio system that is not shown in the drawings, and the air-conditioner controller 24 controls an air-conditioner that is also not shown in the drawings.

The navigation system 25 includes a map data disk, a GPS receiver and the like for displaying a current position of the vehicle and providing route navigation or the like.

The seat sensor 26 is a sensor that detects seating of the driver of the vehicle by detecting a pressure on a surface of the seating of the driver's seat.

The display unit 27 is a liquid crystal display, an organic EL display or the like for displaying an image or the like. The display unit 27 may includes plural display subunits, and the respective subunits may display a specific display content. The display unit 27 may be disposed in front of each of passenger seats.

Figure 2:
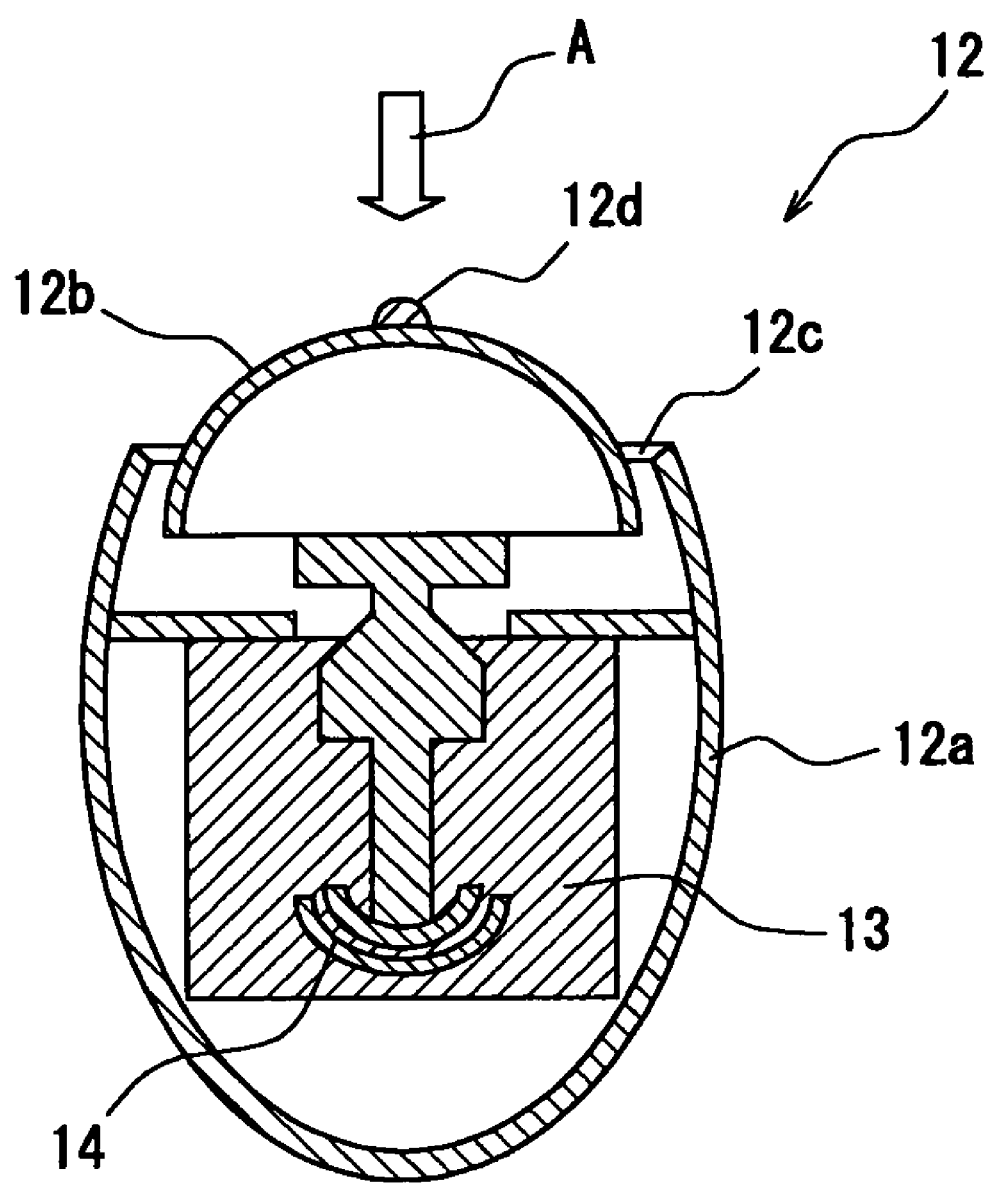
FIG. 2 shows a cross-sectional view of an operation unit of the manual control device.

A structure of the operation unit 12 is described with reference to the drawings. FIG. 2 shows a cross-sectional view of the operation unit 12 seen from a side when the operation unit 12 is disposed in the manual control device 11. The operation unit 12 includes a track ball holder 12a, a track ball 12b, the actuator 13, and the position sensor 14.

The track ball holder 12a is a egg-shaped holder that houses the track ball 12b, the actuator 13, and the position sensor 14. The track ball 12b protrudes an opening 12c of the track ball holder 12a.

The track ball 12b is a half-transparent hemisphere that is rotatably held in all direction within a certain range around a fulcrum at its center. The track ball 12b has a protrusion 12d at a top that serves as a knob when the user operates it. The track ball 12b has a reactive characteristic for returning to a home position when the track ball 12b is released from a user's hand. Further, the track ball 12b can be pressed down in a direction of an arrow A.

The position of the track ball 12b is detected by the position sensor 14, and the detection result is outputted to the control unit 17. The actuator 13 actuates or provides force to the track ball 12b based on the control value from the control unit 17 for providing a reaction force to the driver, or for rotating the track ball 12b by itself.

Figure 3:
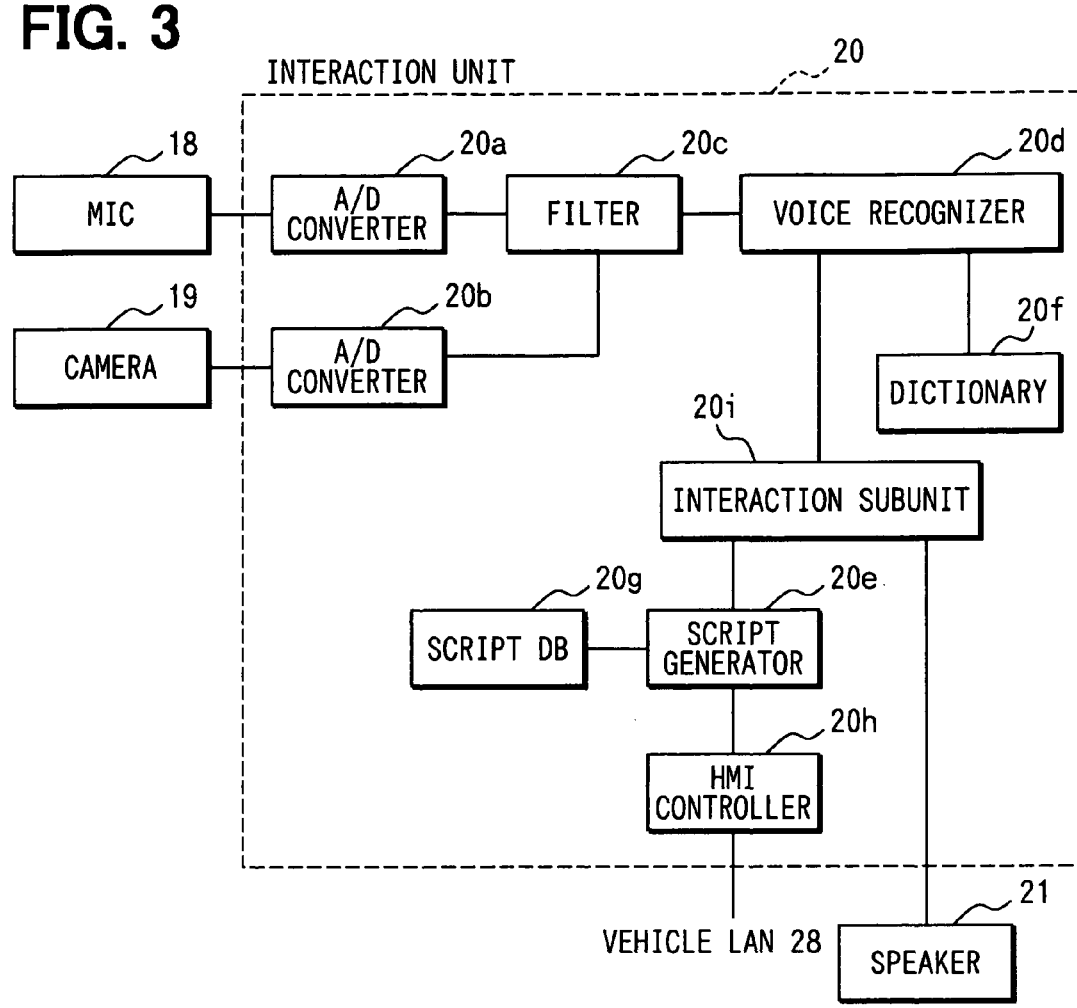
FIG. 3 shows a block diagram of an interaction unit.

The interaction unit 20 is described with reference to the drawings. FIG. 3 shows a block diagram of the interaction unit 20. The interaction unit 20 includes an A/D converter 20a, an A/D converter 20b, a filter 20c, a voice recognizer 20d, a script generator 20e, a dictionary 20f, a script DB 20g, an HMI controller 20h, and an interaction subunit 20i.

The A/D converter 20a converts the voice signal from the microphone 18 to a digital signal, and outputs it to the filter 20c.

The A/D converter 20b converts an image signal from the camera 19 to the digital signal, and outputs it to the filter 20c.

The filter 20c filters the voice signal from the A/D converter 20a, and outputs to the voice recognizer 20d a filtered voice signal that only includes a frequency band of a human voice sound. The filter 20c also filters the image signal from the A/D converter 20b, and outputs to the voice recognizer 20d a filtered image signal that only includes a frequency band suitable for human face expression recognition.

The voice recognizer 20d converts a users voice to a text based on an input the voice signal and the image signal from the filter 20c. The voice recognizer 20d uses the dictionary 20f when it converts the voice/image signal.

The script generator 20e generates an executable script (interim scripts) by combining various scripts stored in the script DB 20g based on an instruction from the interaction subunit 20i.

The dictionary 20f is a dictionary that stores voice patterns and expression patterns for converting the users voice to the text.

The HMI controller 20h analyzes the interim scripts generated by the script generator 20e, and sends instructions to various vehicular devices.

The interaction subunit 20i outputs a voice response to the speaker 21 based on a text input being processed by the voice recognizer 20d according to present interaction patterns, and send instruction for generating a script to the script generator 20e.

Figure 4:
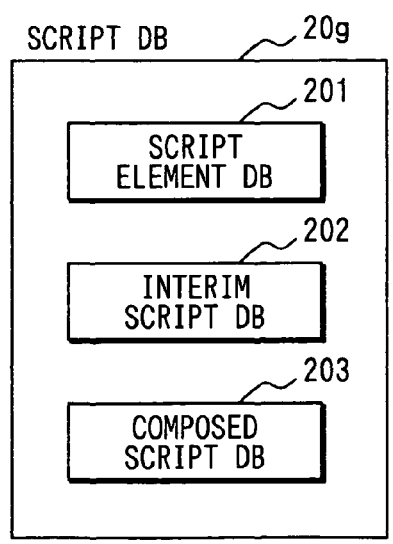
FIG. 4 shows a block diagram of a script database.

The script DB 20g stores scripts that are used to generates executable scripts. Details of the script generation are described with reference to the drawings. FIG. 4 shows a block diagram of a script DB 20g. The script DB 20g includes a script element DB 201, an interim script DB 202, and a composed script DB 203.

The script element DB 201 is a collection of "text words" in combination with script elements. The text word is a text of words included in the user's voice. The script element is an element of an composed interim script that is used as a minimum unit of instructions for operating a device. The interim script is described later in detail.

The text word includes two category, that is, a command and a word. The command is used to describe an action or a condition, and the word is used to describes a name of an object or an attribute.

The command is further categorized into two kinds, that is, a verb and an adverb. For example, the words such as "open, close, push, pull, turn-on, turn-off, operate, stop, start, raise, lower, shut, loosen, rotate, step, expand, shrink and the like are categorized as the verb. The words such as "early, late, slow, high, low, up, down, left, right, and the like are categorized as the adverb.

The word is further categorized into three kinds. That is, a word is either in association with a script element that has a unique ID, with a script element that includes a vehicle ID and a device ID, and with a script element that has not additional information.

For example, the word in association with the script element having the unique ID includes a proper noun (e.g., user names, facility names, road names and the like). The word in association with the script element having the vehicle/device ID includes a vehicle part noun (e.g., an air-conditioner, an audio system, a display, a steering wheel, a brake, an accelerator, a tire, an air-bag, a door and the like). The word in association with the script element having no additional information includes a noun for physical quantity (e.g., a speed, an angle, a distance, a direction (front/back/right/left) and the like).

The word in association with the script element having additional information allows the user to specify an object of control by simply voicing a word, without specifying an ID or the like. For example, the user's voice of "Operate air-conditioner" on a vehicle A retrieves a corresponding interim script from the interim script DB 202, and an indefinite portion of the interim script is filled with the script element. As a result, the interim script for operating an air-conditioner of C type of B make in the vehicle A is generated. An example of the generated script is,

[Script example 1] Start AC on Car A (AC (make B, type C))

The same voice in a vehicle B may generate the following script.

[Script example 2] Start AC on Car B (AC (make D, type E))

The interim script DB 202 is a database of the interim scripts that are used as a minimum unit of instructions for operating a device. The interim script may have an indefinite portion, and the indefinite portion of the script is filled with the additional information in the script element, or with information derived from a query for the user.

The composed script DB 203 is a database of instructions in the user's voice in association with plural interim scripts that are generated according to the respective instructions.

For example, when the user's voice instructs "Repeat the music in playback," a corresponding composed script is searched for in the composed script DB 203, and the searched script is retrieved to be used as the interim script for outputting various instructions for the audio controller 23.

The operation of the manual operation system 10 is described with a focus on a process in the interaction unit 20 that is relevant to the present disclosure. The user operation of the manual control device 11 for controlling other device is omitted from description because of a well-known nature of the user operation.

Figure 5:
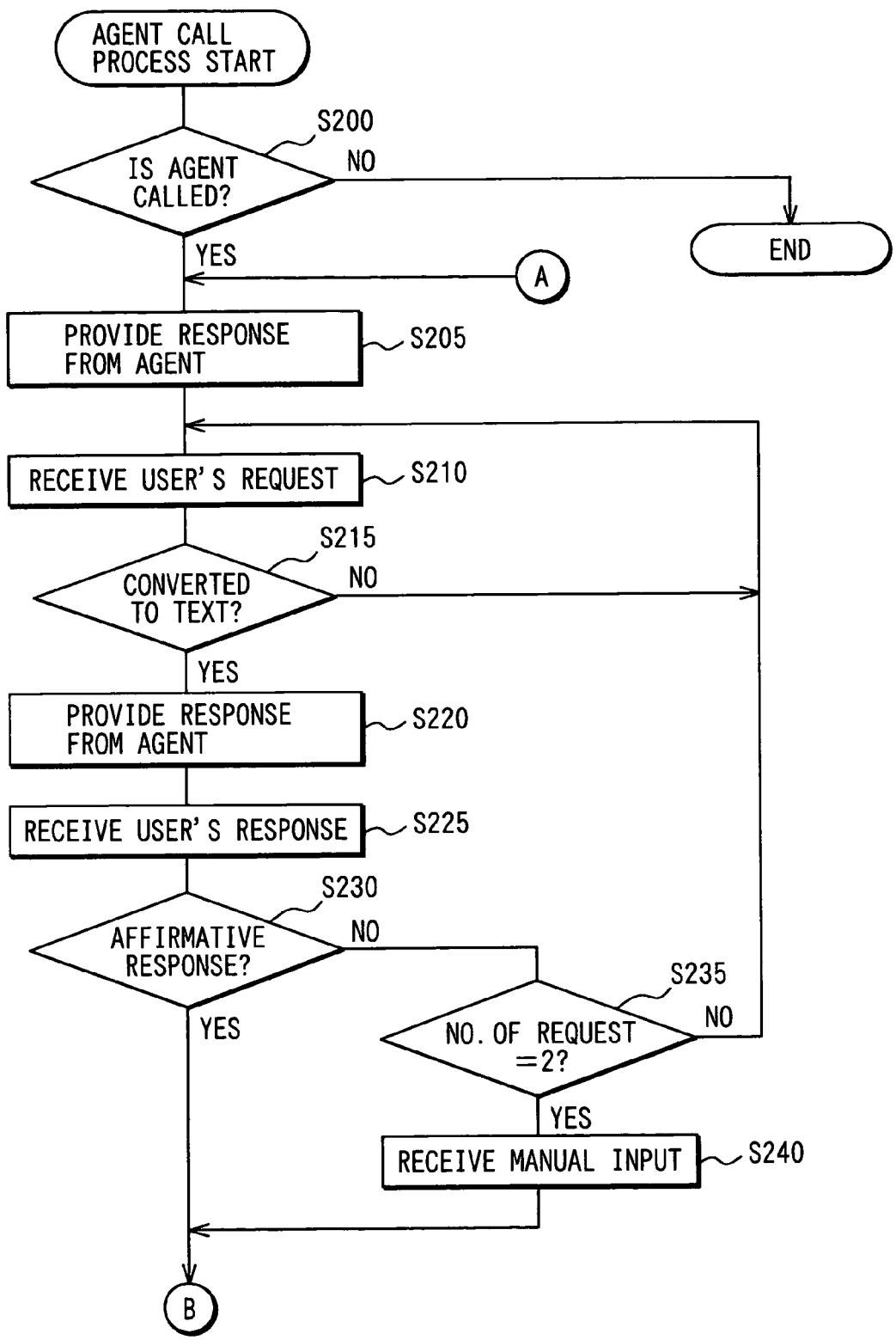
FIG. 5 shows a flowchart of an agent call process.
Figure 6:
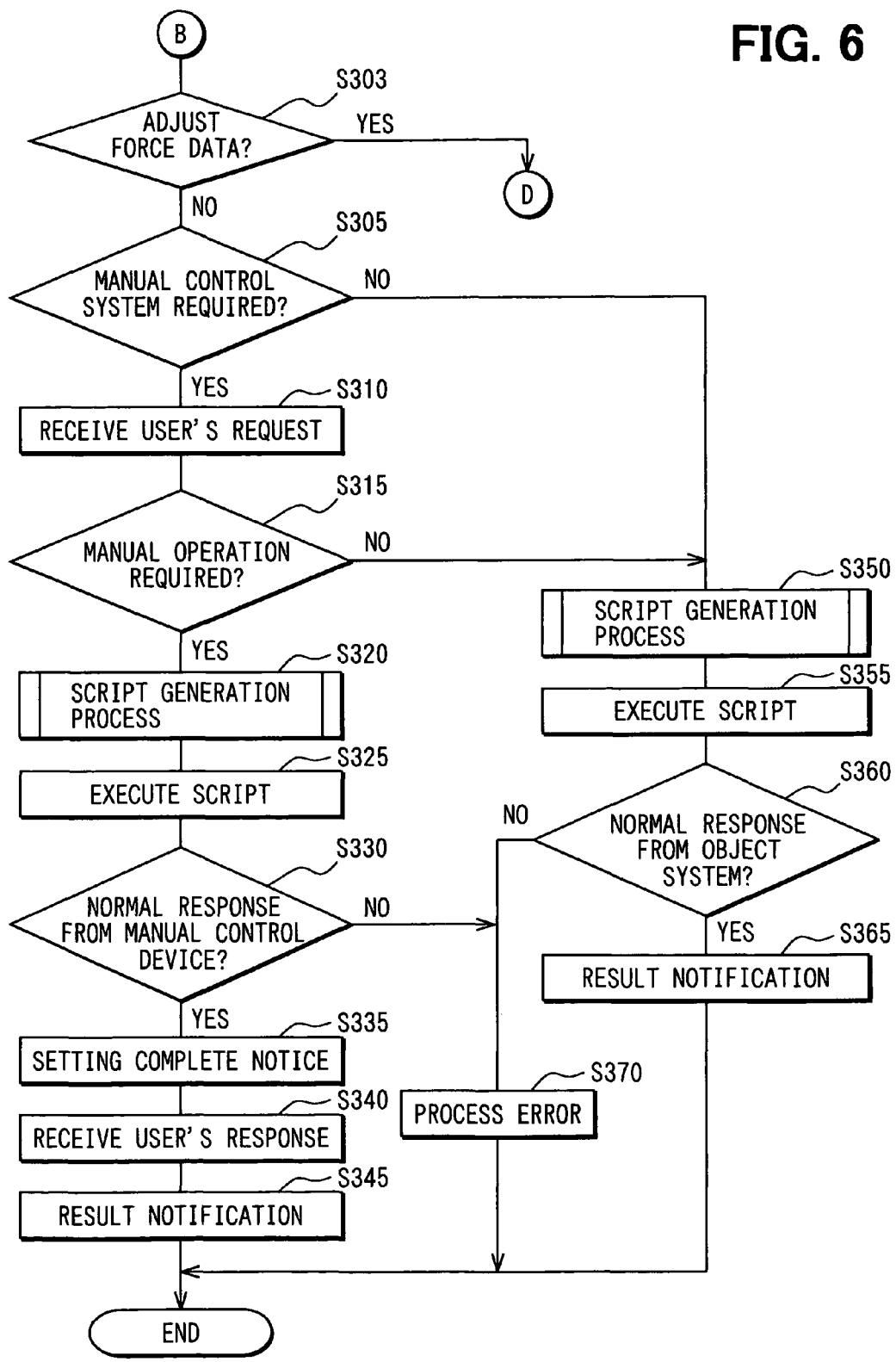
FIG. 6 shows another flowchart of the agent call process.

An agent call process in the interaction unit 20 is described with reference to FIGS. 5 and 6. The agent call process is executed when the user provides a voice to the microphone 18.

In step S200, the process determines whether the user desires start of the agent call process based on a user's voice. That is, the user's voice recognized by the voice recognizer 20*d* is used for determination. For example, a word "agent call" or "agent" as well as "hey" is determined to be a request for the agent call process.

The process proceeds to step S205 when the agent call is requested (step S200:YES). The process concludes itself when the agent call is not requested (step S200:NO).

In step S205, the process provides a response as if an agent is responding. For example, the voice from the speaker 21 sounds as "Yes, Agent is waiting." or the like.

In step S210, the process receives user's request. For example, a voice of question such as "May I help you?" or the like is provided from the speaker 21 for encouraging the user to provide requests or instructions, and the user's response in response to the question is received.

In step S215, the process determines whether the response from the user is completely converted to a text by the voice recognizer 20*d*. The process proceeds to step S220 when the response is converted (step S215:YES). The process returns to step S210 when the response is not completely converted to the text (step S215:NO).

In step S220, the process provides an agent response (a response from the agent) to the user. The agent response is provided as the converted text in a synthesized voice from the speaker 21. For example, a user's request for volume control is provided as a feedback such as "Would you like to control volume of the audio system?"

In step S225, the process receives a response from the user. In this step, user's voice in response to the agent response is received.

In step S230, the process determines whether the user's response in step S225 is affirmative. For example, the word such as "Yes," "Yeah," "Uh," or the like after conversion by the voice recognizer 20*d* is determined as an affirmative response. The process proceeds to step S303 in FIG. 6 when the response is affirmative (step S230:YES). The process proceeds to step S235 when the response from the user is, for example, a negative word such as "No," "Wrong," or the like (step S230:NO).

In step S235, the process determines whether the number of reception of the user's request in step S210 equals to two. The process proceeds to step S240 when the number is equal to two (step S235:YES). The process returns to step S210 when the number is not equal to two (step S235:NO).

In step S240, the process receives user's request manually. For example, the user's request is manually inputted by using alphabet keys displayed on a touch panel of the navigation system 25. The process proceeds to step S303 in FIG. 6 after receiving the manual input from the user.

Figure 7:
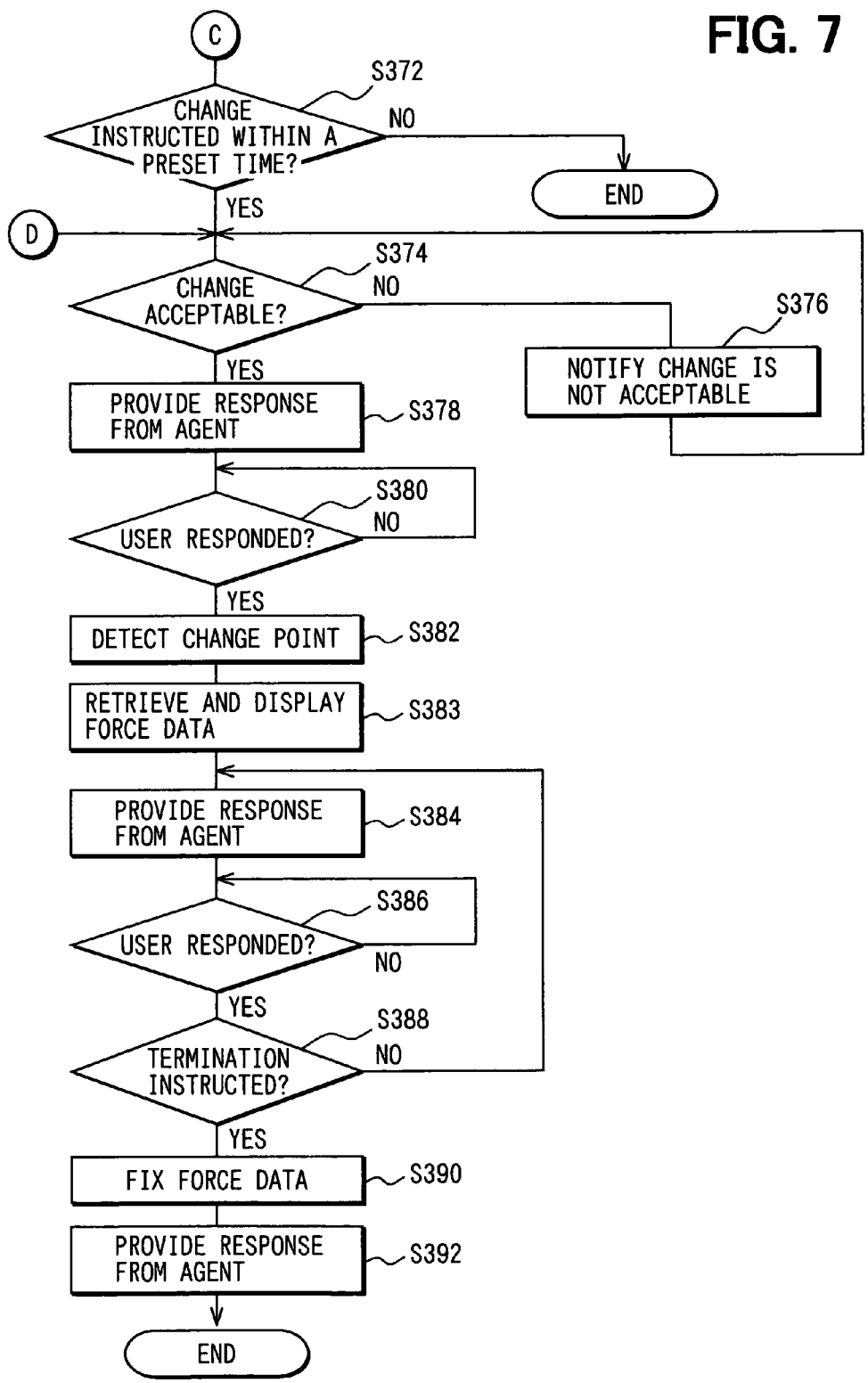
FIG. 7 shows yet another flowchart of the agent call process.

In step S303, the process determines whether the converted text is a word such as "reaction force change" or the like that indicates a change of the reaction force. The process proceeds to step S372 in FIG. 7 when the change is indicated (step S303:YES). The process proceeds to step S305 when the change is not indicated (step S303:NO).

In step S305, the process determines whether the manual control device 11 is required for an input. For example, when the user's request in step S210 is a control of the volume of the audio system, the process determines that the user requires the manual control device 11 for inputting the volume of the sound and proceeds to step S310 (step S305:YES). When the user's request is turning off of the audio system, the process proceeds to step S350 (step S305:NO).

In step S310, the process receives the user's request. For example, the voice of question such as "Would you use manual control device 11?" or the like is provided from the speaker 21 for encouraging the user to provide requests or instructions, and the user's response in response to the question is received.

In step S315, the process determines whether the response from the user in step S310 is affirmative. For example, the word such as "Yes," "Yeah," "I would like to use" or the like after conversion by the voice recognizer 20*d* is determined as an affirmative response. The process proceeds to step S320 when the response is affirmative (step S315:YES). The process proceeds to step S350 when the response from the user is, for example, a negative word such as "No," "Wrong," or the like (step S315:NO).

In step S320, the process executes a script generation process. Details of the script generation process are described later.

In step S325, the process executes interim scripts generated in step S320 by the HMI controller 20*h*. The execution of the interim scripts sends instructions to manual control device 11 for appropriately changing the operation condition. The information regarding the travel condition of the vehicle associated with the interim scripts is added to the instruction sent to the manual control device 11 in this step.

In step S330, the process determines whether a normal response from the manual control device 11 is received as a confirmation that indicates that the change of the operation condition of the manual control device 11 is complete. The process proceeds to step S335 when the normal response is received (step S330:YES). The process proceeds to step S370 when the normal response is not received (step S330:NO).

In step S335, the process notifies the user that the operation condition of the manual control device 11 is appropriately changed and is now operable. For example, a message such as "The manual control device 11 is now usable." or the like is provided from the speaker 21. The user starts operating the manual control device 11 upon having the message.

In step S340, the process receives the user's response. The user's response that indicates an end of use of the manual control device 11 is waited and received. For example, the word such as "OK," "Complete," "Finish," or the like is determined as the end of the operation of the manual control device 11. The process proceeds to step S345 when the end of the use of the manual control device 11 is detected.

In step S345, the process receives a notification of operation result from the manual control device 11 and provides the result for the user. For example, the voice message such as "Volume is set to 10." or the like is provided from the speaker 21. The process proceeds to step S372 in FIG. 7 after providing the operation result notification.

In step S350 after determination that use of the manual control device 11 is not required, the process executes the script generation process. Details of the script generation process are described later.

In step S355, the process executes interim scripts generated in step S350 by the HMI controller 20h. The execution of the interim scripts sends instructions to vehicular devices, controllers or the like (except for the manual control device 11) for appropriately changing the operation condition and/or starting operations. The information regarding the travel condition of the vehicle associated with the interim scripts is added to the instructions sent to, for example, the audio controller 23, the air-conditioner controller 24 or the like.

In step S360, the process determines whether normal responses from the devices and the controllers are received as a confirmation that indicates that the changes of the operation condition of the devices and controllers are complete. The process proceeds to step S365 when the normal response is received (step S360:YES). The process proceeds to step S370 when the normal response is not received (step S360:NO).

In step S365, the process receives a notification of operation result from the devices and provides the result for the user. For example, the voice message such as "air-conditioner starts operating." or the like is provided from the speaker 21. The process proceeds to step S372 in FIG. 7 after providing the operation result notification.

In step S370, the process executes a predetermined error processing. The process proceeds to step S372 after processing errors. The error processing includes a provision of the voice message of the content of the error from the speaker 21 or the like.

In step S372, the process determines whether the user responded in a preset period (e.g., within ten seconds) after the result notification. The user's voice such as "Force data change," "Reaction force change," or the similar words, or a press operation on a preset switch is determined as an instruction for the change. The process proceeds to step S374 when the user's change instruction is detected (step S372:YES). The process concludes itself when the instruction is not detected.

In step S374, the process determines whether the change of the force data is acceptable. More practically, the process determines whether the vehicle is traveling based on the information derived from various ECUs or the like collected through the vehicle LAN 28. The process proceeds to step S376 when the vehicle is traveling and is not in a suitable condition for the change (step S374:NO). The process proceeds to step S378 when the vehicle is not traveling and is in a suitable condition for the change of the force data (step S374:YES).

In step S376, the process notifies the user that the change is not acceptable. The process returns to step S374 after the notification.

In step S378, the process provides for the user the agent response from the speaker 21. The agent response notifies the user that the force data is now in a change mode and encourages the user to specify a change point, i.e., an operation position of the operation unit 12. For example, the message such as "Changes force data. Input change point from the operation unit." or the like is provided. When the process arrives at this step after affirmation in step S303, the process makes query for the user regarding, for example, an object function of the force data, and assigns a specified function to the force data before executing step S378 (the determination of the object function is not shown in FIG. 7).

In step S380, the process determines whether the user has responded. The response such as "OK," "Around here," or the like is determined as the user's response and the process proceeds to step S382 after receiving the response (step S380: YES). The process repeats step S380 until the user's response is detected (step S380:NO).

In step S382, the process determines that a current operation position of the operation unit 12 as the change point based on the signal from the position sensor 14.

In step S383, the process retrieves the force data that is currently used in the control unit 17 of the manual control device 11 and visualizes the force pattern on the display unit 27. Details of the visualization are described later.

In step S384, the process provides for the user a query as the agent response from the speaker 21. The query inquires how the force data should be changed. The query inquires that current force data is suitable when step S384 is repeated after negation in step S383.

In step S386, the process determines whether the user or the driver responded to the query. For example, the user's voice such as "Peak down," "Peak up," "OK," or the like that specify how the force data should be changed are regarded as the response. The process proceeds to step S388 when the user has responded (step S386:YES). The process repeats step S386 until the user's response is detected (step S386: NO).

In step S388, the process determines whether the user's response instructs an end of the process. The voice such as "OK," "End," or the like is determined as the end of the process. The process proceeds to step S390 when the end instruction is detected (step S388:YES). The process returns to step S384 after responding to the user's message when the end instruction is not detected (step S388:NO). In this case, the response to the user's message is, for example, to decrease the height of the peak of the force data at the change point when the user's voice is "Peak down." The changed force data is immediately sent to the manual control device 11 for operating the device 11 according to the changed data. In addition, the visualized force data immediately reflects the change as well.

In step S390, the process sends instruction to the control unit 17 for storing the force data currently used in the manual control device 11 in the memory 15.

In step S392, the process provides the agent response from the speaker 21 for notifying that the change of the force data is complete.

Figure 8:
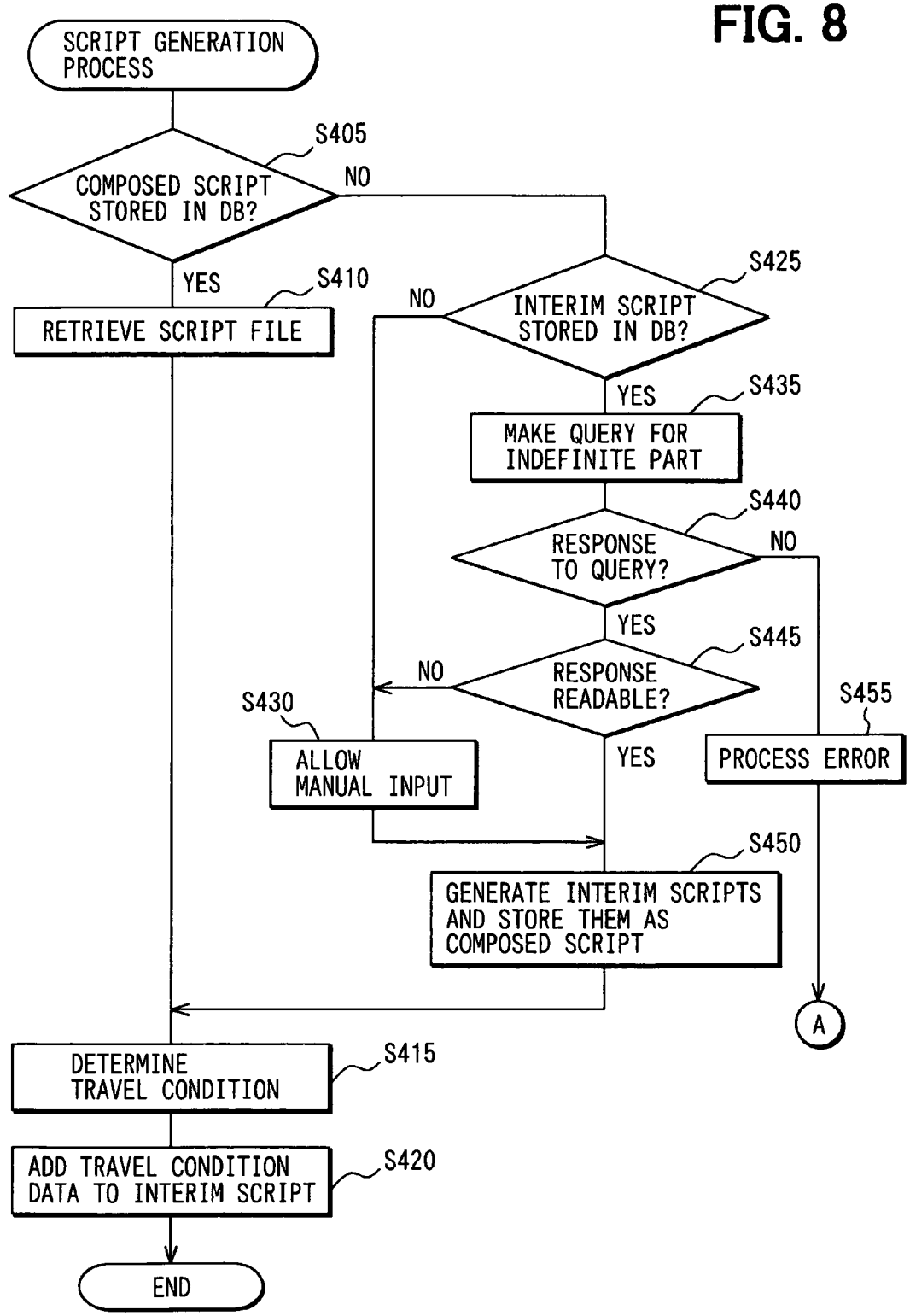
FIG. 8 shows a flowchart of a script generation process.

The script generation process is described with reference to the flowchart in FIG. 8. This script generation process are called in step S320 or step S350 of the agent call process.

The interaction unit 20 starts the execution of the script generation process.

In step S405, the process determines whether the converted text of the user's request (user's voice) is found in the composed script DB 203. The user's request is converted to the text in step S215 by the voice recognizer 20d. The process proceeds to step S410 when the text is found in the DB 203 (step S405:YES). The process proceeds to step S425 when the text is not found in the DB 203 (step S405:NO).

In step S410, the process retrieves a file of the composed script from the composed script DB 203.

In step S415, the process acquires and determines a travel condition of the vehicle based on information from various ECUs and the like. For example, the travel conditions such as a vehicle speed (whether the vehicle is traveling), a brake operation, a turn signal operation, a steering wheel operation, an occupant seating condition, an open/close condition of windows/doors and the like are acquired.

In step S420, the process adds the information acquired in step S415 to the composed script (i.e., a group of the interim scripts) as required, and concludes the script generation process to return to step S320 or S350.

In step S425, the process determines whether the converted text of the user's request (user's voice) is found in the interim script DB 202. The user's request is converted to the text in step S215 by the voice recognizer 20d. The process proceeds to step S435 when the text is found in the DB 202 (step S425:YES). The process proceeds to step S430 when the text is not found in the DB 202 (step S425:NO).

In step S435, the process retrieves the interim script from the DB 202 and indefinite portion of the interim script is asked as a query to the user. For example, a query such as "What channel would you like to watch?" "What CD would you like to listen?" or the like is asked to the user from the speaker 21 to have a response from the user.

In step S440, the process determines whether the user responded to the query. The process proceeds to step S445 when the user responded to the query (step S440:YES). The process proceeds to step S455 when the user does not respond to the query within a preset period (step S440:NO).

In step S445, the process determines whether the response from the user is readable. The response is determined as readable when it can be converted to a text and is suitable to be used as the indefinite portion of the script. For example, the response such as "Channel one," "The third CD," or the like is determined as suitable. The process proceeds to step S450 when the response is readable (step S445:YES). The process proceeds to step S430 when the response is not readable (step S445:NO).

In step S455, the process executes error processing and concludes the script generation process. The error processing includes a provision of the voice message of the content of the error from the speaker 21 or the like. The process returns to step S205 of the agent call process after the notification.

In step S450, the process fills the indefinite portion of the interim scripts with the response from the user acquired in step S435. Further, the process adds a required interim scripts for, for example, an initialization to make a file of the interim scripts. The interims script file is stored in the composed script DB 203 as the composed script. The process proceeds to step S415 after storing the composed script.

The interaction between the user and the interaction unit 20 is described with reference to the tables in FIGS. 9 to 12.

A first example of the interaction is illustrated in the tables in FIGS. 9 and 10. In step S501, the user's voice is determined as "Agent call." In step S503, the interaction unit 20 starts the agent call process. In step S505, the interaction unit 20 outputs a voice "Yes, Agent is waiting." as the agent response from the speaker 21. In step S507, the interaction unit 20 outputs a voice "How may I help you?" as the agent response from the speaker 21.

In step S509, the user's voice is determined as "I would like to change the sound volume." In step S511, the user's voice is converted to a text. Then, in step S513, the interaction unit 20 outputs a voice "Would you like to change the sound volume?" as the agent response from the speaker 21.

In step S515, the user's voice is determined as "Yes." In step S517, the interaction unit 20 determines the user's response as an affirmative one. In step S519, the interaction unit 20 determines whether the use of the manual control device 11 is required for accommodating the content of the user's response. In step S521, the interaction unit 20 outputs a query for the user "Would you like to use the manual control device 11?" from the speaker 21.

In step S523, the user's voice is determined as "Yes." In step S525, the interaction unit 20 determines the user's response as an affirmative one. In step S527, the interaction unit 20 starts the execution of the script generation process. Then, the interaction unit 20 executes the group of the interim scripts after generating them. An example of the group of the interim scripts is listed below.

[Script Example 1]
Set sound#volume of the Audio to manual#op (Manual control of a sound volume of the audio)
Set the manual#op to the left-hand remote-controller (Manual control of a sound volume of the audio with the left-hand side manual control device)
Set the driver#name to the user#name of manual#op (User name set to driver#name)
Set the condition of running to the force data of manual#op (Use force data setting for running vehicle)

In step S529, the interaction unit 20 sends instructions to the manual control device 11 by executing the interim scripts. As a result, the interaction unit 20 changes the force data and the control data. For example, the operation unit 12 tilted toward a front of the vehicle increases the sound volume, and the operation unit 12 tilted toward a back of the vehicle decreases the sound volume. The reaction force against tilting is stronger when the vehicle is running compared to the reaction force applied when the vehicle is stopping.

In step S531, the interaction unit 20 receives a setting complete notice from the manual control device 11 in response to the above instruction. Then, in step S533, the interaction unit 20 outputs a voice "Manual control device 11 is ready to use." as the agent response from the speaker 21.

In step S535, the user operates the manual control device 11 to control the sound volume. When the user's voice is determined as "OK," the protrusion 12d of the manual control device 11 is operated to be in a certain position to indicate the sound volume of 5 in step S537. Then, in step S539, the interaction unit 20 outputs a voice "Sound volume is set to 5." as a notification of the operation result from the speaker 21.

In step S541 in FIG. 10, the user's voice is determined as "Change force data" within a preset time (e.g., 10 seconds) from the notification of the operation result. In step S543, the interaction unit 20 determines that the user is not content with the reaction force applied to the operation unit 12, and provides the agent response in a voice "Agent changes force data. Input a change point." from the speaker 21.

In step S545, the user's voice is determined as "Around here." when the operation unit 12 of the manual control device 11 is operated to be in an operation position where the reaction force sensed by the user is not satisfactory in the volume control operation. In step S547, the interaction unit 20 detects the operation position of the manual control device 11 from a detection result of the position sensor 14, and obtains the force data currently used in the control unit 17 of the manual control device 11. Then, in step S549, the interaction unit 20 visualizes a force pattern in the force data on the display unit 27, and outputs a voice "Change point is detected. Input how the reaction force should be changed." from the speaker 21. The visualization of the force pattern is later described in detail.

In step S551, the user's voice is determined as "Peak down." In step S553, the interaction unit 20 changes the force data to have the reaction force reduced by 10% at the change point to reflect the user's response, and operates the manual control device 11 with the changed force data. Then, the interaction unit 20 outputs a voice "Reaction force decreased by 10%. How would you like it?" from the speaker 21.

In step S555, the user's voice is determined as "Peak down" again due to an unsatisfactory result of the change. In step S557, the interaction unit 20 again changes the force data to have the reaction force reduced by 10% at the change point to reflect the user's response, and operates the manual control device 11 with the changed force data. Then, the interaction unit 20 outputs a voice "Reaction force decreased by 10%. How would you like it?" from the speaker 21.

In step S559, the user's voice is determined as "Peak up a little" due to a too weak reaction force after the change. In step S561, the interaction unit 20 changes the force data to have the reaction force increased by 5% at the change point to reflect the user's response, and operates the manual control device 11 with the changed force data. Then, the interaction unit 20 outputs a voice "Reaction force increased by 5%. How would you like it?" from the speaker 21.

In step S563, the user's voice is determined as "OK" due to a satisfactory change result. In step S565, the interaction unit 20 outputs a voice "Agent determines the force data as it is. Then, in step S567, the interaction unit 20 stores the force data in the memory 15 of the manual control device 11.

A second example of the interaction is illustrated in the table in FIG. 11. In step S601, the user's voice is determined as "Agent call." In step S603, the interaction unit 20 starts the agent call process. In step S605, the interaction unit 20 outputs a voice "Yes, Agent is waiting." as the agent response from the speaker 21. In step S607, the interaction unit 20 outputs a voice "How may I help you?" as the agent response from the speaker 21.

In step S609, the user's voice is determined as "I would like to change the sound volume to 5." In step S611, the user's voice is converted to a text. Then, in step S613, the interaction unit 20 outputs a voice "Would you like to change the sound volume to 5 ?" as the agent response from the speaker 21.

In step S615, the user's voice is determined as "Yes." In step S617, the interaction unit 20 determines the user's response as an affirmative one. In step S619, the interaction unit 20 determines whether the use of the manual control device 11 is not required for accommodating the content of the user's response. In step S621, the interaction unit 20 starts the execution of the script generation process. Then, the interaction unit 20 executes the group of the interim scripts after generating them. Then, the interaction unit 20 sends instructions to the audio controller 23 by executing the interim scripts. The audio controller 23 changes the sound volume according to the instructions.

In step S625, the interaction unit 20 receives a setting complete notice from the audio controller 23 in response to the above instruction. Then, in step S627, the interaction unit 20 outputs a voice "Sound volume is set to 5." as a notification of the operation result from the speaker 21.

A third example of the interaction is illustrated in the table in FIG. 12. In step S701, the user's voice is determined as "Agent call." In step S703, the interaction unit 20 starts the agent call process. In step S705, the interaction unit 20 outputs a voice "Yes, Agent is waiting." as the agent response from the speaker 21. In step S707, the interaction unit 20 outputs a voice "How may I help you?" as the agent response from the speaker 21.

In step S709, the user's voice is determined as "Change force data." In step S711, the user's voice is converted to a text. Then, in step S713, the interaction unit 20 outputs a voice "Would you like to change the force data?" as the agent response from the speaker 21.

In step S715, the user's voice is determined as "Yes." In step S717, the interaction unit 20 determines the user's response as an affirmative one. In step S719, the interaction unit 20 outputs a voice "Agent changes the force data. What function would you like to change?"

In step S721, the user's response is determined as "Power of air-conditioner." In step S723, the interaction unit 20 outputs the agent response in a voice "Input a change point." from the speaker 21.

In step S725, the user's voice is determined as "Around here." when the operation unit 12 of the manual control device 11 is operated to be in an operation position where the reaction force sensed by the user is not satisfactory. In step S727, the interaction unit 20 detects the operation position of the manual control device 11 from a detection result of the position sensor 14, and obtains the force data of the specified function (power control of the air-conditioner) from the memory 15 of the manual control device 11. Then, the interaction unit 20 visualizes a force pattern in the force data on the display unit 27. In step S729, the interaction unit 20 outputs a voice "Change point is detected. Input how the reaction force should be changed." from the speaker 21.

In step S731, the user's voice is determined as "Round off." In step S733, the interaction unit 20 changes the force pattern of the reaction force to be rounded at and around the change point, and applies the changed force data to the manual control device 11. Then, the interaction unit 20 outputs a voice "Reaction force rounded off at the change point. How would you like it?" from the speaker 21.

In step S735, the user's voice is determined as "OK." due to a satisfactory change result after a trial operation. In step S737, the interaction unit 20 outputs a voice "Agent determines the force data as it is. Then, in step S739, the interaction unit 20 stores the force data in the memory 15 of the manual control device 11.

Figure 13A:
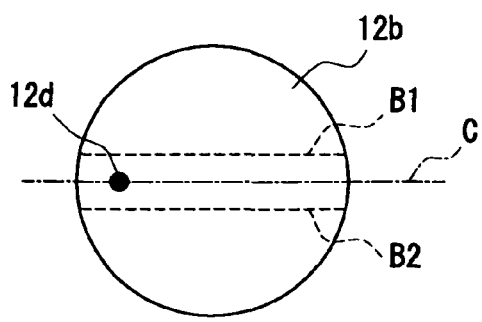
FIG. 13A to 13C show illustrations of force patterns in force data.

The visualization of the force data is described with reference to illustrations in FIGS. 13A to 13C. FIG. 13A shows an illustration of a top view of the track ball 12b. The protrusion 12d of the track ball 12b is tilted toward left in FIG. 13A. The force data defines the reaction force at every operation position (broken down to a granularity of sensing resolution of the position sensor 14) as a reaction force value. In this case, as an assumption, the reaction force is set to keep the operation of the protrusion 12d within an area that is defined by broken lines B1 and B2. In addition, the manual control device 11 is assumed to be controlling the sound volume stepwise from level 1 to level 5.

Figure 13B:
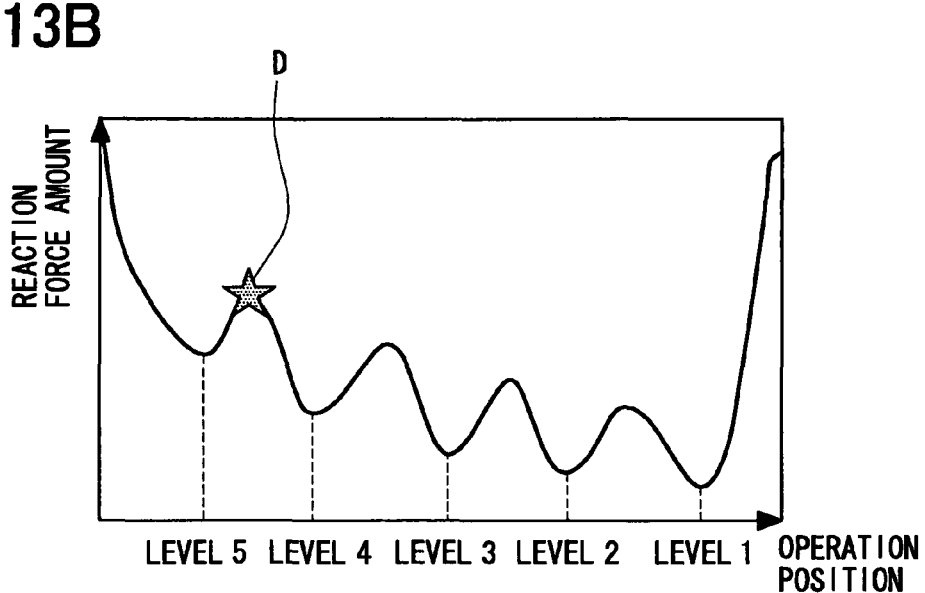

FIG. 13B shows an illustration of the amount of the reaction force that is sensed by the user when the user operates the protrusion 12d along a chain line C in FIG. 13A. The horizontal axis of the illustration is the operation position on the chain line C, and the vertical axis is the amount of the reaction force. The illustration shows that there are five bottoms corresponding the five volume levels, and the press operation of the protrusion 12d at one of those bottoms sets the sound volume to be in a desired level.

Figure 13C:
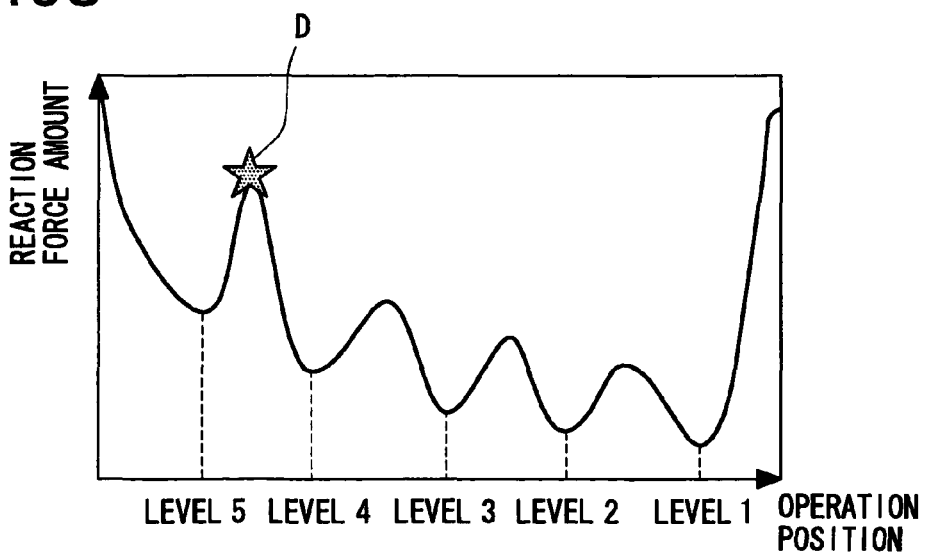

When the user specifies a position D between level 5 and level 4 as the change point and provides the voice "Peak up," the point D is raised to the position in FIG. 13C. That is, the reaction force at the point D is increased.

The illustrations shown in FIGS. 13B and 13C are shown on the display unit 27 for visually representing the force pattern of the reaction force. Therefore the user of the manual control device 11 can intuitively change the force pattern of the reaction force in an interactive manner.

The manual operation system 10 having the manual control device 11 and the interaction unit 20 allows the user to control the force data based on the interaction between the user and the system 10. Therefore, the user can assign a specific force data (e.g., a changed force pattern) to a specific function (e.g., the sound volume control). In this manner, the user can intuitively operate the manual operation system 10 without practice, experience nor dexterity. As a result, occurrence of operation error is prevented and/or reduced.

The script generation function in the manual operation system 10 generates and appends a required script to a database in a memory, thereby reducing a time to regenerate the required script.

The instructions from the HMI controller 20h to the manual control device 11 or other vehicular devices reflects the travel condition of the vehicle, thereby adjustably improves the operation condition of the devices suitably to the travel condition. For example, the operation error is reduced by allowing simple operations when the user is involved in driving operations.

The control result of the manual control device 11 or other devices are notified to the user in a voice, thereby serving a comfort of reconfirmation of the operation result or the like for the user.

The discomfort sensed in the operation of the manual control device 11 by the user can immediately be resolved by interactively changing the force pattern. Therefore, the user can always have an appropriately controlled reaction force. In addition, the change of the force pattern is controlled and specified by the operation unit 12, thereby providing an ease of operation in terms of specifying the position of the pattern or the like.

Although the present disclosure has been fully described in connection with the preferred embodiments thereof with reference to the accompanying drawings, it is to be noted that various changes and modifications will become apparent to those skilled in the art.

For example, the interaction between the user and the agent for changing the force data is not necessarily required. The change of the force data may be conducted without the interaction. That is, the change of the force data may be controlled by a one-way command voiced by the user. Even in that case, the visualization of the force data may be used for facilitating the operation. In this manner, the user can control the reaction force to have a suitable amount.

Further, the control data may be changed in a similar manner for changing the force data. That is, the operation position of the protrusion 12d of the manual control device 11 and associated function may be arbitrarily changed based on the interaction between the user and the agent. For example, the user's voice of "Move position of level 5 to the right." or the like may be used to control the bottom position of the level 5 in a situation illustrated by FIG. 13B.

Such changes and modifications are to be understood as being within the scope of the present invention as defined by the appended claims.

What is claimed is:

1. A manual operation system for use in a vehicle under control of a user comprising:
    an operation unit for serving the user with a manual operation;
    an actuator for providing an operational force for the operation unit;
    a detector for detecting an operation position of the operation unit;
    a memory unit for storing force data that defines a relationship between a detection result of the detector and a control value of the actuator in association with control data that defines a relationship between the detection result of the detector and a control signal for controlling an object device;
    a first control unit for outputting the control value to the actuator and outputting the control signal to the object device based on the force data, the control data and the detection result of the detector;
    an interaction unit for vocally providing an interaction with the user; and
    a second control unit in the interaction unit for changing the force data and the control data for use by the first control unit based on a content of the interaction provided by the interaction unit, wherein
    the second control unit generates and stores a script based on the content of the interaction,
    the second control unit changes at least one of the force data and the control data by executing the script,
    the second control unit changes the force data by retrieving the script from the memory unit when the script stored in the memory unit is usable,
    the second control unit changes the force data by generating the script when the script stored in the memory unit is not usable,
    the second control unit determines whether the script in the memory unit is usable for the user;
    the second control unit determines whether the second control unit sends the control signal to the object device directly based on the content of the interaction by providing a query for the user, and
    the second control unit sends the control signal directly to the object device upon determining that the control signal is to be sent directly to the object device based on a user response to the query.

2. The manual operation system as in claim 1 further comprising:
    a vehicle information acquisition unit for acquiring information on a vehicle condition,
    wherein, by taking account of the information on the vehicle condition acquired by the vehicle information acquisition unit, the second control unit determines at least one of two decisions whether the second control unit applies a change to at least one of the force data and the control data and whether the change to at least one of the force data and the control data is acceptable.

3. The manual operation system as in claim 1, wherein
    the second control unit determines whether the second control unit sends the control signal to the object device directly based on the content of the interaction, and
    the second control unit sends the control signal to the object device directly upon having the determination of direct sending of the control signal.

4. The manual operation system as in claim 1, wherein
    the first control unit conveys to the second control unit a content of the control signal sent to the object device, and the second control unit controls the interaction unit for vocally outputting the content of the control signal received from the first control unit.

5. The manual operation system as in claim 1 further comprising: a voice input unit in the interaction unit for inputting a voice of the user, wherein the second control unit changes the force data stored in the memory unit based on a preset vocal command inputted to the voice input unit.

6. The manual operation system as in claim 1, wherein the second control unit changes the force data stored in the memory unit based on the content of the interaction provided by the interaction unit.

7. The manual operation system as in claim 6, wherein the second control unit changes the force data by considering the detection result of the detector when the interaction for changing the force data is started by the interaction unit.

8. The manual operation system as in claim 2 further comprising:
   a voice input unit in the interaction unit for inputting a voice of the user, wherein
   the second control unit changes the force data stored in the memory unit based on a preset vocal command inputted to the voice input unit,
   the second control unit determines whether the change of the force data is acceptable based on the information acquired by the vehicle information acquisition unit, and
   the second control unit changes the force data when the change of the force data is acceptable.

9. The manual operation system as in claim 2, wherein
   the second control unit determines whether the change of the force data is acceptable based on the information acquired by the vehicle information acquisition unit,
   the second control unit changes the force data when the change of the force data is acceptable, and
   the second control unit changes the force data stored in the memory unit based on the content of the interaction provided by the interaction unit.

10. The manual operation system as in claim 9, wherein the second control unit changes the force data by considering the detection result of the detector when the interaction for changing the force data is started by the interaction unit.

11. The manual operation system as in claim 1,
    wherein the script includes a script element, an interim script and a composed script,
    wherein the script element is an element of the interim script,
    wherein the interim script is a minimum unit of instructions for operating the object device, and
    wherein the composed script is a user instruction in association with a plurality of interim scripts.

* * * * *